US007951282B2

(12) United States Patent
Ward

(10) Patent No.: US 7,951,282 B2
(45) Date of Patent: May 31, 2011

(54) HYDROMETALLURGICAL PROCESSING OF MANGANESE CONTAINING MATERIALS

(75) Inventor: Christopher Brett Ward, Attadale (AU)

(73) Assignee: Mesa Minerals Limited, Applecross (AU)

(*) Notice: Subject to any disclaimer, the term of this patent is extended or adjusted under 35 U.S.C. 154(b) by 1212 days.

(21) Appl. No.: 10/501,277

(22) PCT Filed: Oct. 1, 2003

(86) PCT No.: PCT/AU03/01295
§ 371 (c)(1),
(2), (4) Date: Sep. 3, 2004

(87) PCT Pub. No.: WO2004/033738
PCT Pub. Date: Apr. 22, 2004

(65) Prior Publication Data
US 2005/0103163 A1 May 19, 2005

(30) Foreign Application Priority Data
Oct. 10, 2002 (AU) ................. 2002952042

(51) Int. Cl.
C25C 1/10 (2006.01)

(52) U.S. Cl. ......... 205/539; 205/540; 205/541; 205/542
(58) Field of Classification Search ........... 205/539–542
See application file for complete search history.

(56) References Cited

U.S. PATENT DOCUMENTS

| 3,301,777 | A | * | 1/1967 | Leonard | 204/290.11 |
| 3,438,878 | A | * | 4/1969 | Brown et al. | 205/412 |
| 5,932,086 | A | * | 8/1999 | Kasaaian | 205/573 |

FOREIGN PATENT DOCUMENTS

| DE | 3211658 A1 | 10/1983 |
| WO | WO 98/14623 | 4/1998 |

* cited by examiner

Primary Examiner — Arun S Phasge
(74) Attorney, Agent, or Firm — Gottlieb, Rackman & Reisman, PC

(57) ABSTRACT

A process for the hydrometallurgical processing of manganese containing materials, the process characterized by the combination of a manganese dioxide containing feedstock and an acidic solution to form an acidic solution to be leached, and passing a volume of sulphur dioxide gas through that leach solution as the leaching agent, whereby no sintering or roasting pre-treatment step of the feedstock is undertaken and the levels of dithionate ion generated in the leach solution are less than about 5 g/l. Also described is a process for the production of electrolytic manganese dioxide.

22 Claims, 3 Drawing Sheets

HYDROMETALLURGICAL PROCESSING OF MANGANESE CONTAINING MATERIALS

FIELD OF THE INVENTION

The present invention relates to the hydrometallurgical processing of manganese containing materials. More particularly, the process of the present invention is intended to allow efficient hydrometallurgical processing of low-grade manganese dioxide feedstock to produce manganese products, including electrolytic manganese dioxide.

BACKGROUND ART

It is generally known that manganese may be leached from manganese dioxide containing ores using sulphur dioxide. However, the sulphur dioxide leaching of manganese dioxide containing materials is also known to produce by-product dithionate ion levels of >5 g/l. These levels may be far higher depending upon the amount of manganese being leached. For example, levels of about 20 g/l are not uncommon. Interestingly, it is reported in Cotton and Wilkinson, Advanced Inorganic Chemistry, 3rd Edition at page 452, that "the method for production of dithionate or dithionic acid is the reaction between sulphur dioxide or sulphite with manganese dioxide in the presence of acid".

Low grade manganese dioxide feedstock (<40% Mn) are presently uneconomic to process using conventional roast-reduction and sulphuric acid leaching to produce manganese sulphate. High grade ores (>40% Mn) are needed to justify the economics of the roast reduction process. Presently, all leaching of manganese dioxide containing materials using sulphur dioxide leads to the formation of >5 g/l levels of dithionate ions in solution. With dithionate ion levels of this magnitude it is generally necessary to incorporate into any flow sheet a high capital cost stage, being "oxidation" or "aging". The long residence times required to "oxidise" the dithionate ion from the >5 g/l levels down to lower than 1 g/l are highly capital intensive.

Failure to control dithionate levels in the production of a manganese sulphate crystal product has previously led to the manganese dithionate contaminant in that product slowly reacting to release sulphur dioxide gas.

It would prove advantageous to provide a process whereby low-grade manganese dioxide containing materials or feedstock could provide manganese sulphate leach solutions with a level of dithionate ion less than about 5 g/l, and preferably less than 1 g/l.

The ability to recover manganese dioxide from low-grade feedstocks will avoid or at least reduce the need for further manganese ore mining and land disturbance, bringing various environmental benefits. For example, the utilisation of manganese tailings allows for conservation of existing resources.

Further, the use of a hydrometallurgical route for the reduction of Mn(IV) negates the need for the use of gas fired kilns or fluid bed reactors, feed stocks no longer need to be heated to about 1000° C. and then cooled prior to leaching, and there is lesser need for carbon input, which in turn results in lower greenhouse gas emissions.

Still further, the use of the relatively easily controlled hydrometallurgical route allows monitoring of the solution potential of the leach solution or slurry thereby indicating complete dissolution of Mn(IV). The use of the sulphur dioxide leach provides complete conversion of Mn(IV) to Mn(II), thereby avoiding the production of leachable manganese species in solid residues.

In particular, if it is desired to produce electrolytic manganese dioxide ("EMD"), solutions containing elevated dithionate ion levels result in chemical reactions occurring that effect the quality and purity of the EMD produced in the electrowinning cells. Also, hydrogen sulphide is evolved, bringing with it certain occupational health and environmental issues.

The preceding discussion of the background art is intended to facilitate an understanding of the present invention only. It should be appreciated that the discussion is not an acknowledgement or admission that any of the material referred to was part of the common general knowledge in Australia as at the priority date of the application.

Throughout the specification, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a process for the hydrometallurgical processing of manganese containing materials, the process characterised by the combination of a manganese dioxide containing feedstock and an acidic solution to form an acidic solution to be leached, and passing a volume of sulphur dioxide gas through that leach solution as the leaching agent, whereby no sintering or roasting pre-treatment step of the feedstock is undertaken and the levels of dithionate ion generated in the leach solution are less than about 5 g/l.

Preferably, the levels of dithionate ion generated in the leach solution are less than about 1 g/l.

Still preferably, the pH of the leach solution is maintained at less than about 1.5.

In one form of the invention the leach solution comprises a slurry of manganese dioxide containing material at a slurry density of less than about 10% w/v, less than about 120 g/l manganese sulphate, a temperature of greater than about 95° C., and at a pH of less than about 1.5.

In another form of the invention the manganese dioxide containing feedstock contains less than about 40% manganese.

Preferably, the leach solution has an initial soluble iron concentration of greater than 4 g/l. The iron is preferably in the form of ferric sulphate ($Fe_2(SO_4)_3$). The ferrous concentration is preferably maintained at a level below about 0.5 g/l by providing an excess or residual amount of manganese dioxide in the slurry.

The ratio of ferric to ferrous may be monitored throughout the leach to ensure an oxidation reduction potential (ORP) of 550 mV, or above (vs Ag/AgCl reference electrode).

The sulphur dioxide gas is preferably passed through the leach solution over a period of at least 10 hours whereby up to about 95% of manganese dioxide is dissolved. Preferably, the leach is conducted over a period of between about 10 to 15 hours.

Preferably, once a stoichiometric amount of sulphur dioxide has been added to the leach solution to achieve a 95% dissolution of the manganese dioxide present, the reaction is halted.

In accordance with present invention there is further provided a process for the production of electrolytic manganese dioxide, the process characterised by a leach of a manganese dioxide containing feedstock, without a sintering or roasting pre-treatment step of that feedstock, in which a volume of sulphur dioxide gas as the leaching agent is passed through an acidic solution containing manganese dioxide, the dithionate ion levels in said solution being maintained at less than about 5 g/l, the resulting leach solution being processed to provide an appropriate electrolyte that is passed to an electrowinning stage during which electrolytic manganese dioxide is deposited.

Preferably, the levels of dithionate ion generated in the leach solution are less than about 1 g/l.

Still preferably, the pH of the leach solution is maintained at less than about 1.5.

In one form of the invention the leach solution comprises a slurry of manganese dioxide containing material at a slurry density of less than about 10% w/v, less than about 120 g/l manganese sulphate, a temperature of greater than about 95° C., and at a pH of less than about 1.5.

In another form of the invention the manganese dioxide containing feedstock contains less than 40% manganese.

Preferably, the leach solution has an initial soluble iron concentration of greater than 4 g/l. The iron is preferably in the form of ferric sulphate ($Fe_2(SO_4)_3$). The ferrous concentration is preferably maintained at a level below about 0.5 g/l by providing an excess or residual amount of manganese dioxide in the slurry.

The ratio of ferric to ferrous may be monitored throughout the leach to ensure an oxidation reduction potential (ORP) of 550 mV, or above (vs Ag/AgCl reference electrode).

The sulphur dioxide gas is preferably passed through the leach solution over a period of at least 10 hours whereby up to about 95% of manganese dioxide is dissolved. Preferably, the leach is conducted over a period of between about 10 to 15 hours.

Preferably, once a stoichiometric amount of sulphur dioxide has been added to the leach solution to achieve a 95% dissolution of the manganese dioxide present, the reaction is halted.

Preferably, the acidic solution used in the leach is at least in part comprised of return or spent sulphuric acid solution from the electrowinning stage. It may be necessary to add additional acid to the leach to ensure the pH remains less than about 1.5.

BRIEF DESCRIPTION OF THE DRAWINGS

The present invention will now be described, by way of example only, with reference to one embodiment thereof and the accompanying drawings, in which.

BEST MODE(S) FOR CARRYING OUT THE INVENTION

Figure 1:
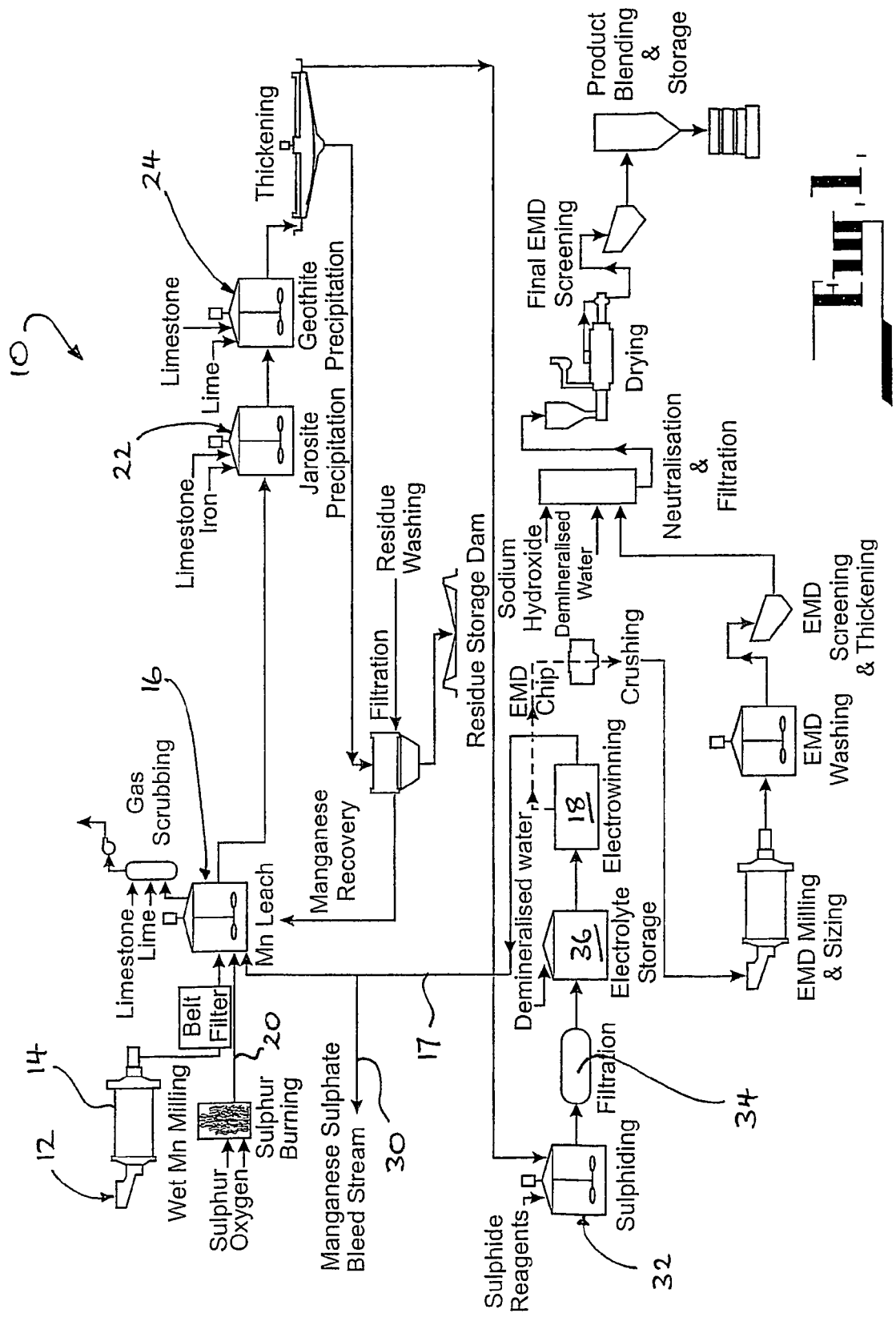
FIG. 1 is a schematic flow chart of a process for the production of an electrolytic manganese dioxide product from a low grade manganese feedstock in accordance with the present invention.

In FIG. 1 there is shown a process 10 for the production of electrolytic manganese dioxide (EMD) product in accordance with the present invention. A manganese dioxide ore feedstock 12, containing about 34% manganese, is initially milled in a wet ball mill 14 prior to the generated slurry being passed to a leach 16 conducted in at least one agitated reactor.

In addition to the milled feedstock slurry the leach 16 is fed with return sulphuric acid electrolyte 17 from an electrowinning stage 18 to form a leach solution. The leach solution has a volume of sulphur dioxide gas 20 passed therethrough, the sulphur dioxide gas 20 being formed through a sulphur burning step 22, in which sulphur is burnt in oxygen to generate sulphur dioxide.

The slurry density of the feedstock fed from the mill 14 is less than 10% w/v. The slurry is both heated and agitated, as the leach solution, once within the or each reactor 16. The concentration of manganese sulphate ($MnSO_4$) in the leach solution is <120 g/l whilst the temperature of the leach solution is >95° C. The leach solution is maintained at a pH of less than about 1.5.

The leach solution within the leach 16 has an initial soluble iron concentration of >4 g/l. The iron is in the form of ferric sulphate ($Fe_2(SO_4)_3$). The ferrous concentration is maintained at less than 0.5 g/l by ensuring there is always an excess or residual amount of manganese dioxide in the leach.

The leach is conducted over a period of 10 to 15 hours by passing a volume of sulphur dioxide gas through the leach solution. The rate at which the sulphur dioxide is passed through the leach solution is governed by the requirement that up to 95% of the manganese dioxide in the slurry fed to the leach 16 is dissolved/solubilized over the period of 10 to 15 hours. It is envisaged that longer time periods may be utilised.

The ratio of ferric to ferrous in the leach 16 is monitored by an Oxidation Reduction Potential (ORP) probe. A minimum value of 550 mV is required (vs Ag/AgCl reference electrode). If the ORP value falls below 550 mV more feedstock slurry is added to the leach 16.

It is believed that the predominant leaching reaction proceeds as follows:

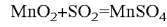

$$MnO_2 + SO_2 = MnSO_4$$

However, it is understood that whilst the process of the present invention ensures that the production of manganese sulphate is the predominant reaction, a trace of dithionate is still generated. The production of dithionate is believed to proceed as a free radical combination reaction as follows:

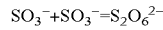

$$SO_3^- + SO_3^- = S_2O_6^{2-}$$

High pH values favour the production of dithionate. As such, the pH of the leach 16 is maintained at less than about 1.5, as noted hereinabove.

Figure 2:
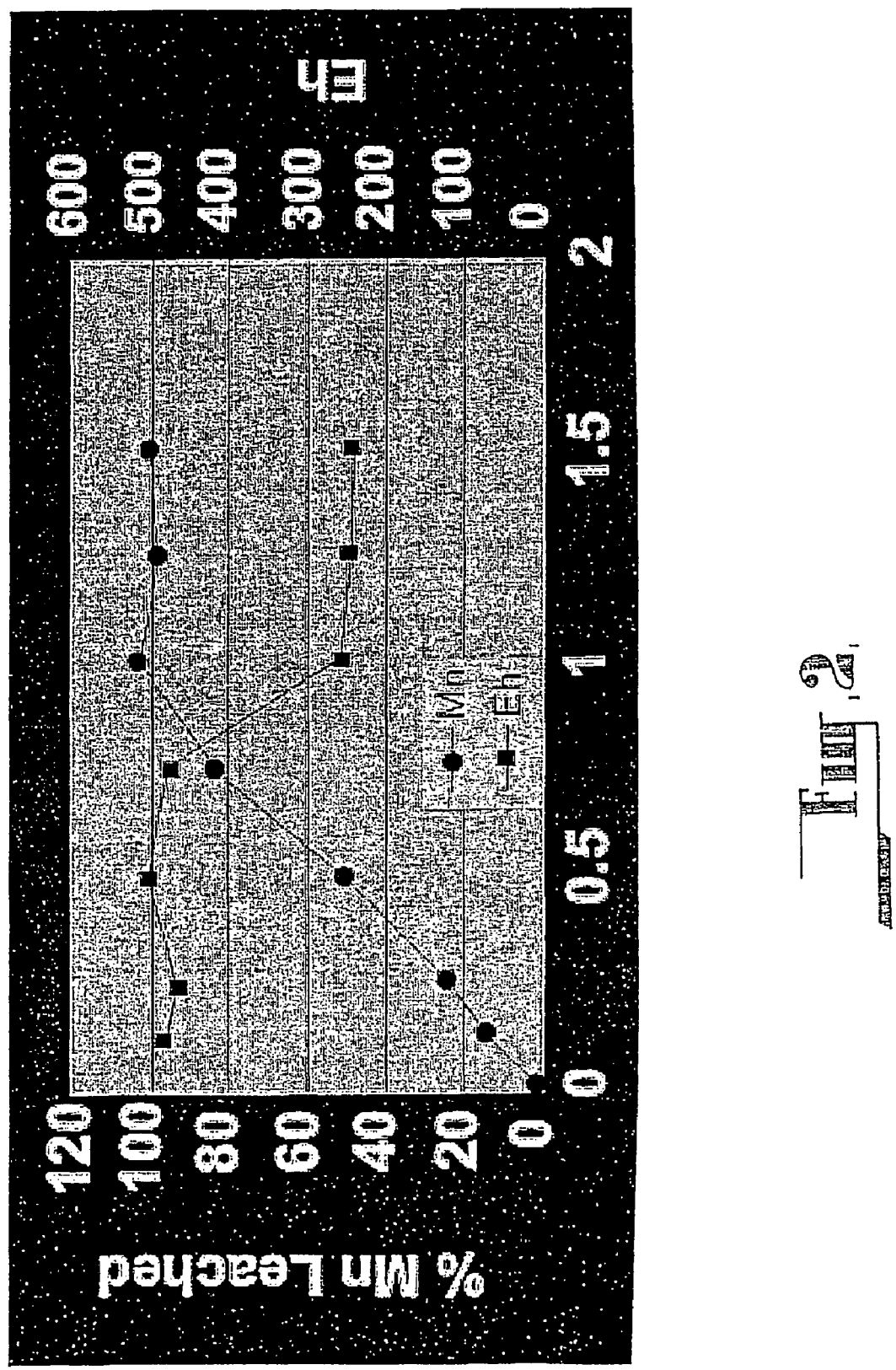
FIG. 2 is a graphical representation of the percentage manganese "leached" relative to $SO_2$ addition and Eh during the leach conducted within the process of FIG. 1.
Figure 3:
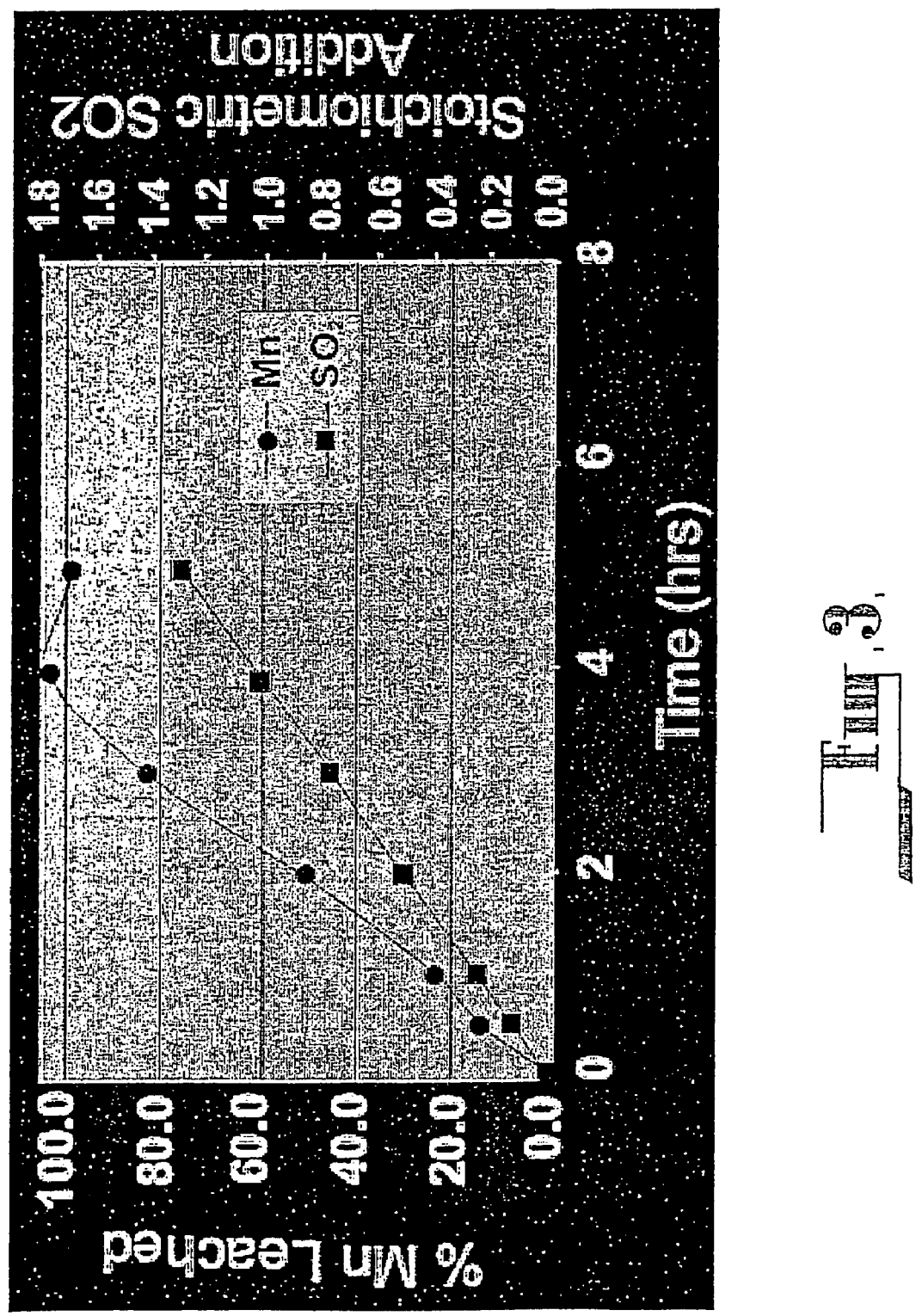
FIG. 3 is a graphical representation of the percentage manganese "leached" over time and relative to $SO_2$ additional during the leach of FIG. 2.

Once a stoichiometric quantity of sulphur dioxide 20 has been fed through the leach solution, whereby a maximum of 95% of the manganese dioxide present is dissolved/solubilized, the reaction is halted by withdrawing the sulphur dioxide 20 feed to the leach 16. The stoichiometric addition of $SO_2$ is represented graphically in FIG. 2 relative to the % manganese leached and the Eh, showing that the Eh or solution potential provides an accurate indication of completion of the manganese (IV) dissolution reaction, whilst FIG. 3 demonstrates the effect of sulphur dioxide addition on the % manganese leached over time.

It is envisaged that the sulphur dioxide 20 might also be provided as a waste gas from a smelting or an industrial process. Further, the sulphur dioxide might be added to the leach solution as a sulphite solution ($SO_3^{2-}$).

The remainder of the process 10 for the production of EMD involves the passing of pregnant leach solution to a jarositing step 22 to reduce potassium and sodium levels as desired. A goethiting step 24 is then used to reduce iron levels to sub-ppm levels through the addition of ground limestone. A solid/liquid separation step is then used, involving both thickening 26 and filtration 28.

Solids from the filtration 28 are washed to reclaim any residual manganese sulphate solution, this being fed back to the leach 16 to make up any volume lost from the return electrolyte 17 to a manganese sulphate bleed stream 30. This bleed stream 30 allows manganese sulphate to be concurrently produced for use in fertilisers, for example.

Overflow from the thickening 26 is passed to a sulphiding step 32 for the removal of heavy metals, including nickel, cobalt and molybdenum. Following the sulphiding step 32 the heavy metal sulphides are removed by pressure filtration 34 and the electrolyte from the electrowinning step 18 held in storage tanks 36.

The electrowinning step 18 then proceeds utilising submerged titanium anodes, tubular copper cathodes and a totally wax free environment. Fully laden anodes are harvested on a two-weekly cycle with resulting EMD chip being passed to produce processing and packaging operations.

It is envisaged that the process of the present invention, specifically as it resides in the leaching of manganese containing feed stocks to produce leach solutions with dithionate ion levels of less than 5 g/l, and preferably less than 1 g/l, may be applied to the processing of all types of manganese dioxide containing ores (including both high and low grade), mine tailings, fines, fumes and tailings of manganese ferro-alloy production facilities, ocean floor manganese nodules, ferromanganese nodules, wastes from zinc refinery cells and manganese dioxide contained in used or partially used alkaline or carbon zinc batteries. The leach solutions generated by reprocessing such materials in accordance with the present invention can then be purified and used in the production of EMD, EMM and other manganese chemical products.

Modifications and variations such as would be apparent to the skilled addressee are considered to fall within the scope of the present invention.

The invention claimed is:

1. A process for the hydrometallurgical processing of manganese containing materials, the process characterised by:
    combining a manganese dioxide containing feedstock having less than 40% Mn with an acidic solution to form a leach solution; and
    leaching the leach solution by passing a volume of sulphur dioxide gas as the leaching agent through said leach solution to produce a manganese compound,
    while maintaining the level of dithionate ion generated in the leach solution at less than about 5 g/l by maintaining an excess of manganese dioxide in the leach solution and maintaining the oxidation reduction potential of the leach solution at a level of at least about 550 mV (vs Ag/AgCl reference electrode), wherein the leach solution further contains levels of soluble iron and the ferrous concentration is maintained at a level below about 0.5 g/l by the excess of manganese dioxide.

2. A process according to claim 1, wherein the level of dithionate ion generated in the leach solution is maintained at less than about 1 g/l.

3. A process according to claim 1, wherein the pH of the leach solution is maintained at less than about 1.5.

4. A process according to claim 1, wherein the leach solution comprises a slurry of manganese dioxide containing material at a slurry density of less than about 10% w/v, less than about 120 g/l manganese sulphate, a temperature of greater than about 95° C., and at a pH of less than about 1.5.

5. A process according to claim 1, wherein the initial soluble iron concentration in the leach solution is greater than 4 g/l.

6. A process according to claim 5, wherein the iron is in the form of ferric sulphate ($Fe_2(SO_4)_3$).

7. A process according to claim 1, wherein the ratio of ferric to ferrous is monitored at least at intervals throughout the leach.

8. A process according to claim 1, wherein the sulphur dioxide gas is passed through the leach solution over a period of at least 10 hours, whereby up to about 95% of manganese dioxide is dissolved.

9. A process according to claim 1, wherein the leach is conducted over a period of between about 10 to about 15 hours.

10. A process according to claim 1, wherein the reaction is halted once a stoichiometric amount of sulphur dioxide has been added to the leach solution so as to achieve a 95% dissolution of the manganese dioxide present.

11. A process for the production of electrolytic manganese dioxide, the process characterised by:
    a leach of a manganese dioxide containing feedstock having less than 40% Mn, in which a volume of sulphur dioxide gas as the leaching agent is passed through said feedstock combined with an acidic solution, the dithionate ion levels in the resulting leach solution being maintained at less than about 5 g/l by maintaining an excess of manganese dioxide in the leach solution and maintaining the oxidation reduction potential of the leach solution at a level of at least about 550 mV (vs Ag/AgCl reference electrode), wherein the leach solution further contains levels of soluble iron and the ferrous concentration is maintained at a level below about 0.5 g/l by the excess of manganese dioxide; and
    processing the resulting leach solution to provide an appropriate electrolyte that is passed to an electrowinning stage during which electrolytic manganese dioxide is deposited.

12. A process according to claim 11, wherein the levels of dithionate ion generated in the leach solution are less than about 1 g/l.

13. A process according to claim 11, wherein the pH of the leach solution is maintained at less than about 1.5.

14. A process according to claim 11, wherein the leach solution comprises a slurry of manganese dioxide containing material at a slurry density of less than about 10% w/v, less than about 120 g/l manganese sulphate, a temperature of greater than about 95° C., and at a pH of less than about 1.5.

15. A process according to claim 11, wherein the initial soluble iron concentration in the leach solution is greater than 4 g/l.

16. A process according to claim 15, wherein the iron is in the form of ferric sulphate ($Fe_2(SO_4)_3$).

17. A process according to claim 11, wherein the ratio of ferric to ferrous is monitored at least at intervals throughout the leach.

18. A process according to claim 11, wherein the sulphur dioxide gas is passed through the leach solution over a period of at least 10 hours, whereby up to about 95% of manganese dioxide is dissolved.

19. A process according to claim 11, wherein the leach is conducted over a period of between about 10 to about 15 hours.

20. A process according to claim 11, wherein the reaction is halted once a stoichiometric amount of sulphur dioxide has been added to the leach solution to achieve a 95% dissolution of the manganese dioxide present.

21. A process according to claim 11, wherein the acidic solution used in the leach is comprised at least in part of returned or spent sulphuric acid solution from the electrowinning stage.

22. A process according to claim 21, wherein additional acid is added to the leach to ensure that the pH remains at less than about 1.5.

* * * * *